(12) United States Patent
Tamura et al.

(10) Patent No.: US 7,829,754 B2
(45) Date of Patent: Nov. 9, 2010

(54) METHOD OF CLEANING HEAVY METALS-CONTAINING SOIL

(75) Inventors: Hideo Tamura, Nagoya (JP); Takeshi Sato, Kasugai (JP); Munechika Honda, Minokamo (JP)

(73) Assignee: Chubu Electric Power Co., Inc., Nagoya-shi (JP)

( * ) Notice: Subject to any disclaimer, the term of this patent is extended or adjusted under 35 U.S.C. 154(b) by 587 days.

(21) Appl. No.: 11/662,343

(22) PCT Filed: Sep. 9, 2005

(86) PCT No.: PCT/JP2005/016599

§ 371 (c)(1),
(2), (4) Date: Mar. 8, 2007

(87) PCT Pub. No.: WO2006/028201

PCT Pub. Date: Mar. 16, 2006

(65) Prior Publication Data

US 2008/0071130 A1    Mar. 20, 2008

(30) Foreign Application Priority Data

Sep. 10, 2004  (JP)  ............................. 2004-264601

(51) Int. Cl.
| | |
|---|---|
| A62D 3/30 | (2007.01) |
| A62D 3/33 | (2007.01) |
| A62D 3/00 | (2007.01) |
| A62D 3/02 | (2007.01) |
| C02F 3/32 | (2006.01) |
| C02F 3/34 | (2006.01) |
| B09B 3/00 | (2006.01) |
| B09C 1/10 | (2006.01) |
| C12P 1/00 | (2006.01) |
| C12S 3/00 | (2006.01) |

(52) U.S. Cl. .................. 588/315; 588/313; 588/400; 588/407; 210/602; 435/262; 435/262.5; 435/267

(58) Field of Classification Search .................. 75/710, 75/711, 712; 210/602; 435/262, 262.5, 267; 502/401; 588/249, 261, 313, 315, 400, 405, 588/407, 410, 412; 800/295

See application file for complete search history.

(56) References Cited

FOREIGN PATENT DOCUMENTS

JP          57-190          1/1982

(Continued)

OTHER PUBLICATIONS

Bucheli-Witschel et al. "Environmental fate and microbial degradation of aminopolycarboxylic acids". FEMS Microbiology Reviews 25 (2001) 69-106.*

(Continued)

Primary Examiner—Jerry Lorengo
Assistant Examiner—Jennifer A Smith
(74) Attorney, Agent, or Firm—Edwards Angell Palmer & Dodge LLP

(57) ABSTRACT

A soil cleaning method (phytoremediation) of absorbing a contaminating substance contained in a contaminated soil by a plant to clean the soil. An object of the present invention is to provide a method of cleaning a contaminated soil which performs cleaning of a soil containing heavy metals in a shorter term than before and, at the same time, utilizes phytoremediation having little influence on the environment. The object is attained by absorbing heavy metals by a plant of Polygonaceae family, *Fagopyrum* genus, and, at the same time, adding a biodegradable chelating agent to a contaminated soil in order to assist the absorption. And, a biodegradable chelating agent having the high heavy metal dissolving out ability not only enhances the cleaning efficacy but also reduces secondary influence on the environment.

4 Claims, 5 Drawing Sheets

Test section
Lead concentration in leaves of Fagopyrum esculentum with chelating agent added
Soil lead concentration: 13,032mg/kg

FOREIGN PATENT DOCUMENTS

| | | |
|---|---|---|
| JP | 2000-288529 A | 10/2000 |
| JP | 2002-336837 A | 11/2002 |
| JP | 2002-355665 | 12/2002 |
| JP | 2002-540943 | 12/2002 |
| JP | 2002355665 A * | 12/2002 |
| JP | 2003-275741 | 9/2003 |
| JP | 2004-181303 | 7/2004 |

OTHER PUBLICATIONS

Tandy et al. "Extraction of heavy metals from soils using biodegradable chelating agents". Environmental Science & Technology. vol. 38, No. 3, (Dec. 23, 2003) 937-944.*

The summary of the Ministry of the Environment, "Summary of Examination Results Regarding Soil Contamination Examination-Subject Cases and Circumstances of Response thereto in 1999," Mar. 2001 together with the English translation thereof (3 sheets).

* cited by examiner

[Fig. 1]
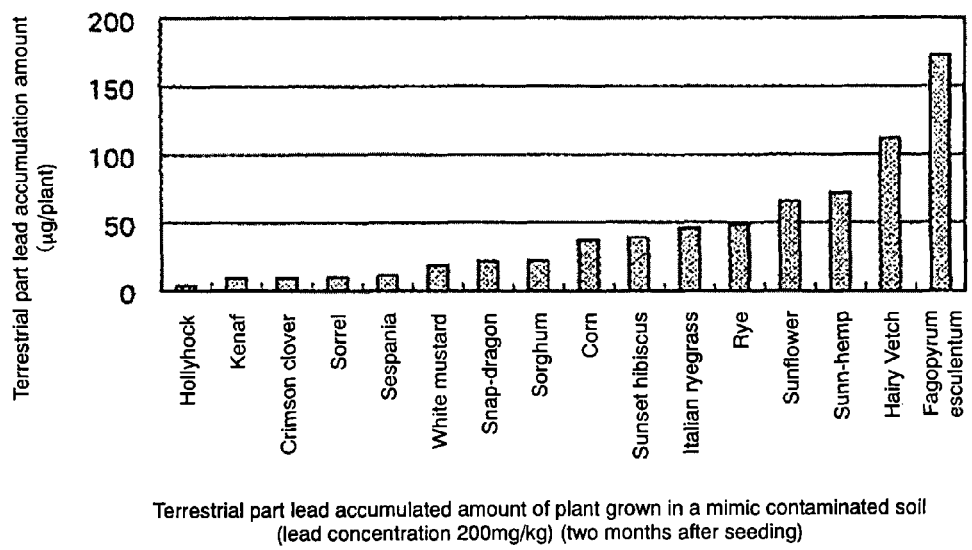
Terrestrial part lead accumulated amount of plant grown in a mimic contaminated soil
(lead concentration 200mg/kg) (two months after seeding)
[Fig. 2]
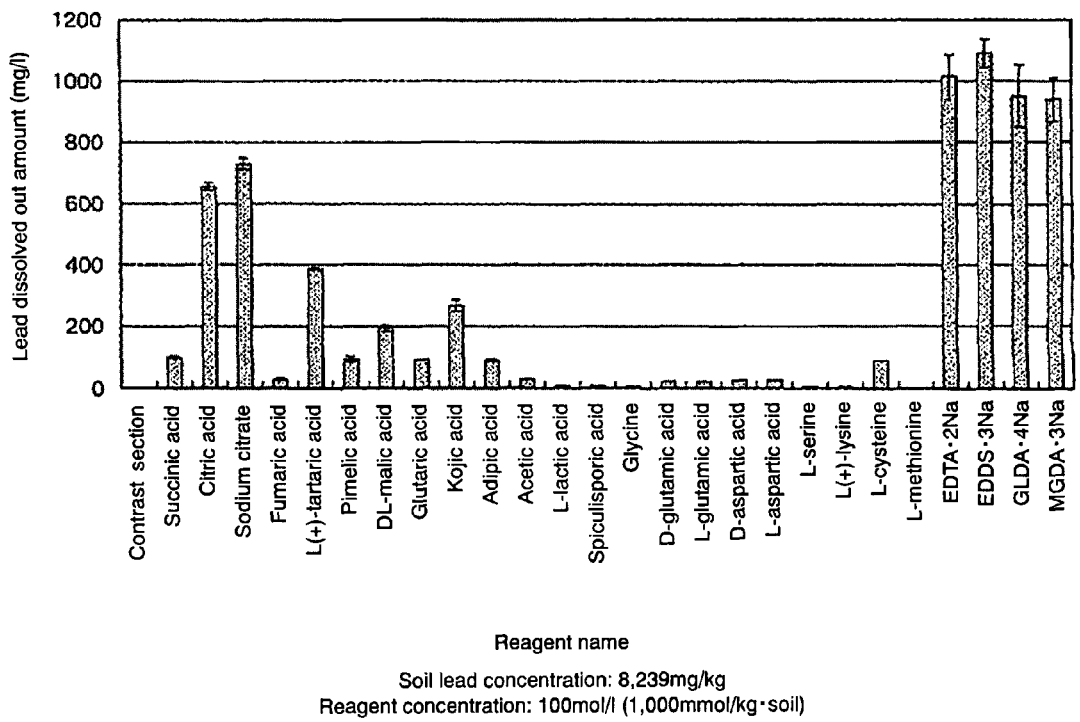
Reagent name
Soil lead concentration: 8,239mg/kg
Reagent concentration: 100mol/l (1,000mmol/kg·soil)

[Fig. 3]
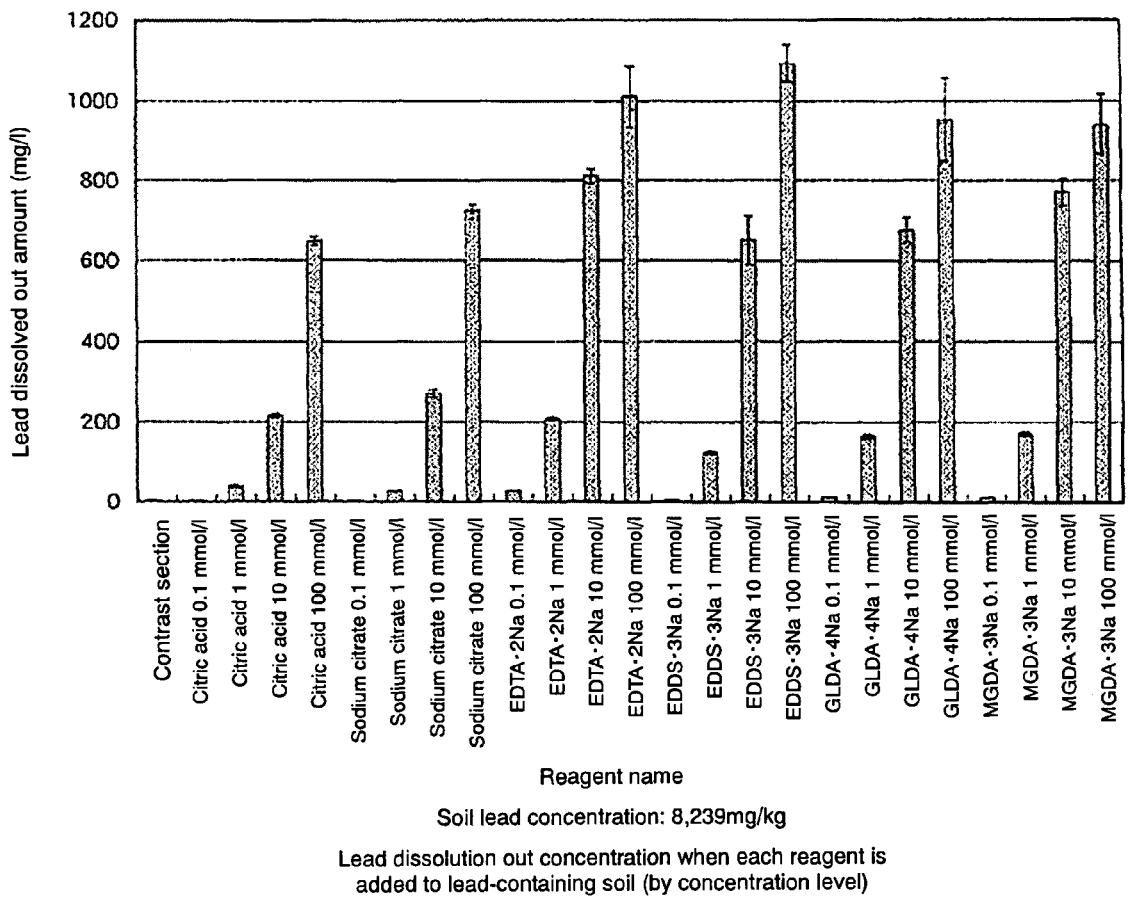
Lead dissolution out concentration when each reagent is added to lead-containing soil (by concentration level)
[Fig. 4]
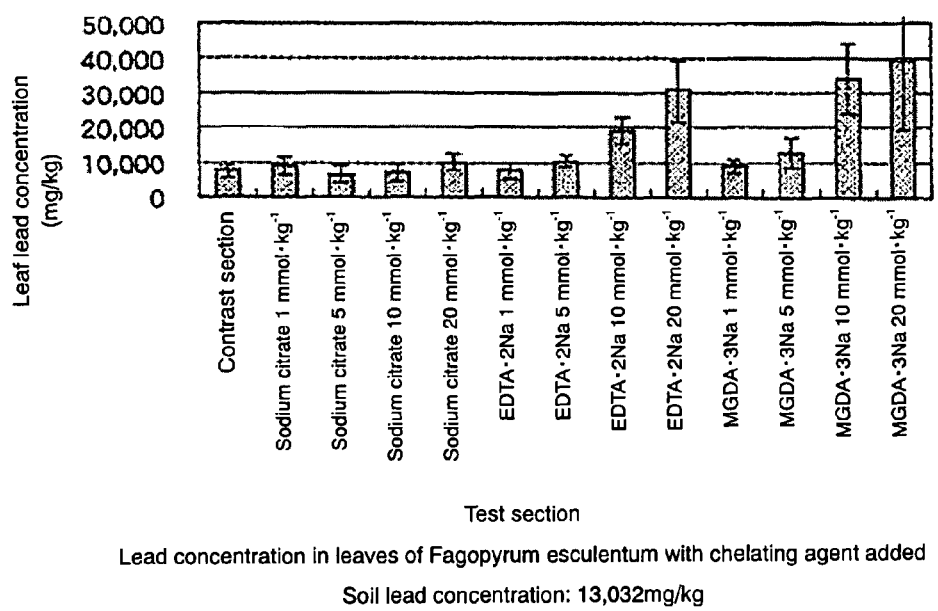
Lead concentration in leaves of Fagopyrum esculentum with chelating agent added
Soil lead concentration: 13,032mg/kg

[Fig. 5]
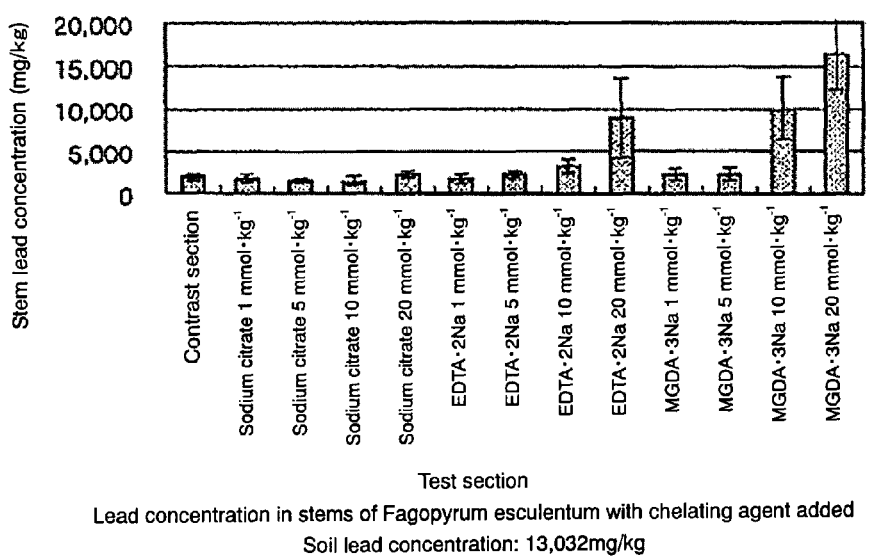
Lead concentration in stems of Fagopyrum esculentum with chelating agent added
Soil lead concentration: 13,032mg/kg
[Fig. 6]
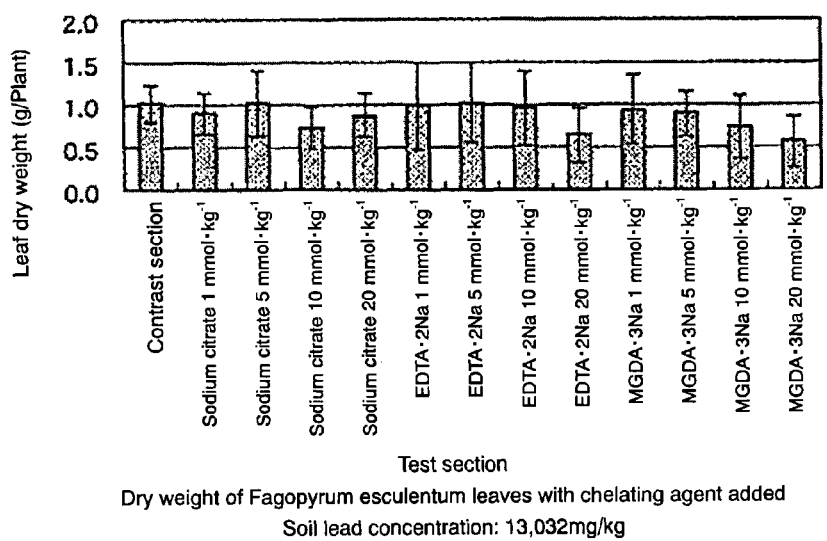
Dry weight of Fagopyrum esculentum leaves with chelating agent added
Soil lead concentration: 13,032mg/kg
[Fig. 7]
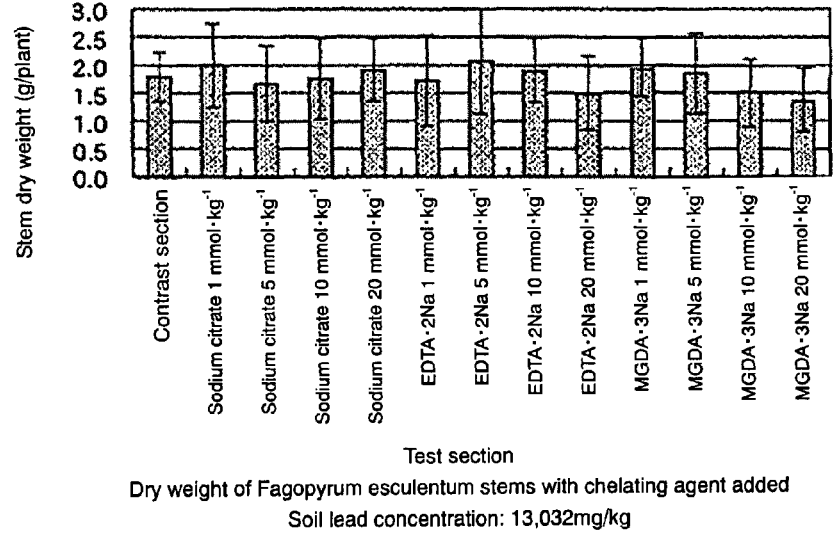
Dry weight of Fagopyrum esculentum stems with chelating agent added
Soil lead concentration: 13,032mg/kg

[Fig. 8]
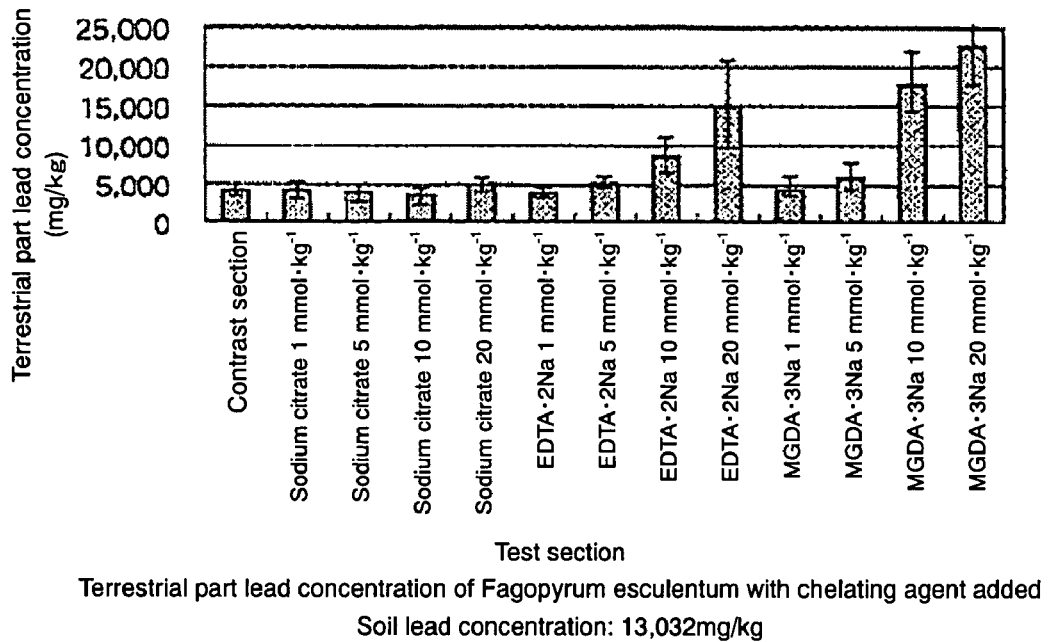
Test section
Terrestrial part lead concentration of Fagopyrum esculentum with chelating agent added
Soil lead concentration: 13,032mg/kg
[Fig. 9]
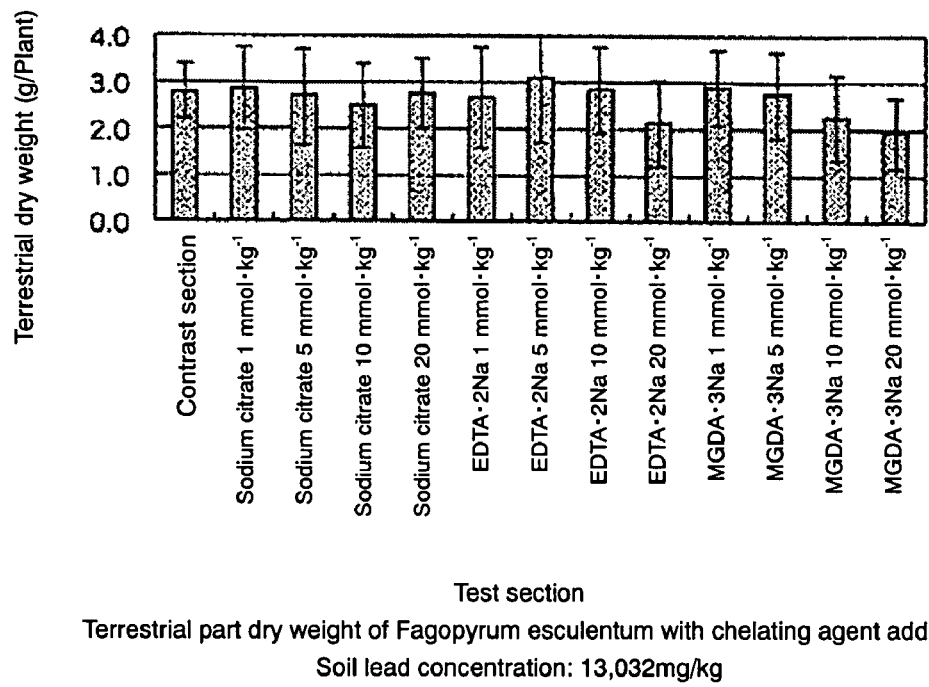
Test section
Terrestrial part dry weight of Fagopyrum esculentum with chelating agent added
Soil lead concentration: 13,032mg/kg

[Fig. 10]
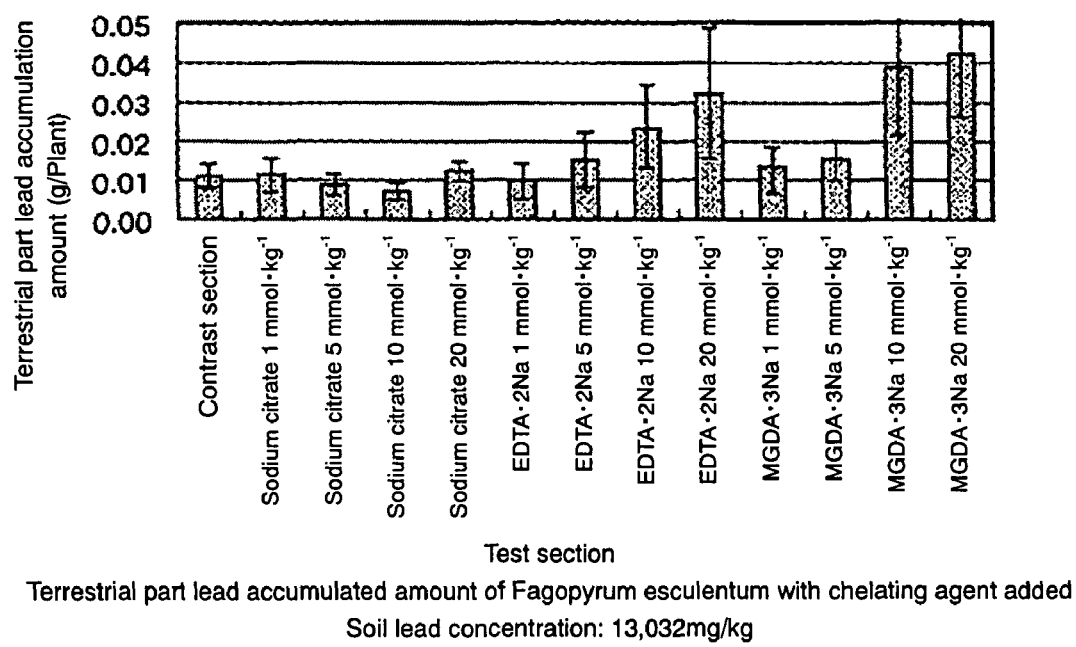
Terrestrial part lead accumulated amount of Fagopyrum esculentum with chelating agent added
Soil lead concentration: 13,032mg/kg

METHOD OF CLEANING HEAVY METALS-CONTAINING SOIL

TECHNICAL FIELD

The present invention relates to a method of cleaning a soil contaminated with heavy metals by environment restoring technique utilizing plants (phytoremediation).

BACKGROUND TECHNIQUE

Currently, environmental contamination in a soil, water and the atmosphere becomes a problem at the global scale.

Among the environmental contaminant, particularly, contaminant of a soil with heavy metals is serious. When checking the actual state of soil contaminant by heavy metal contained, contamination with lead is the highest as 29%, and contamination with arsenic is 24%, and contamination with hexavalent chromium is 15% in that order (The Ministry of the Environment "Summary of Examination Results Regarding Soil Contamination Examination-Subject Cases and Circumstances of Response Thereto" in 1999, March, 2001.

The soil lead contamination is reported in an old factory site, a firing range, a military exercise place or the like, and there is also a report of soil lead contamination around a road with lead released in the atmosphere by combustion of a tetraethyllead-containing gasoline (high-octane gasoline) which has been used until recent year.

On the other hand, a concern about the soil contamination has been increased, and a variety of techniques for cleaning up a soil contaminated with heavy metals or the like have been developed. For example, one is a soil washing method of mechanically washing a contaminated soil to remove harmful substances, and another, a heat-treating method of desorbing, degrading or dissolving contaminating substances by heating a contaminated soil to enclose the contaminating substances. These physical treating methods have an advantage that a term required for cleaning is short, but has a problem due to high cost, and heavy load to a soil.

To the contrary, as the low cost and the light environmental load technique, bioremediation (environmental cleaning utilizing organisms) and phytoremediation (environmental cleaning utilizing plants) technique, utilizing a nature that microorganisms or plants degrade or absorb harmful substances has been developed.

Phytoremediation is a soil cleaning method of absorbing heavy metals into a plant which has been seeded or planted and, thereafter, recovering heavy metals by harvesting the plant (reaping) and performing post-treatment (drying-degradation etc.). The method has an advantage that soil cleaning at the low cost is possible, and a load given to the environment is small since after a plant is seeded (planted) into a contaminated soil, labor hours until harvesting is saved. For this reason, utilization in extensive cleaning of contamination, prevention of contamination of a soil around a waste disposal site and the like are expected, and the following various publications are known.

Patent Literature 1: Japanese Patent Application Laid-Open (JP-A) No. 2000-288529 (specification, paragraph (0005) etc.)

Patent Literature 2: JP-A No. 2002-336837 (specification, paragraph (0009) etc.)

Patent Literature 3: JP-A No. 2002-355665 (claim 5, paragraph (0018) etc.)

Patent Literature 4: Japanese Patent Application National Publication (Laid-Open) No. 2002-540943 (claims 44, 46 etc.)

Patent Literature 5: JP-A No. 2003-275741 (specification, paragraph (0007) etc.)

For example, in the known publication 2, a method effectively cleaning up a soil by selecting a plant excellent in the ability to absorb heavy metals, planting it into a contaminated soil is introduced, and, in the known publication 3, a method of adding a chelating agent to a soil to promote dissolution of heavy metals is introduced.

However, as a trend of a plant excellent in the ability to absorb heavy metals, a growth amount is small, and a growth speed is slow in many cases. The soil cleaning method by phytoremediation has a problem that since a necessary term of works depends on a growth speed of a plant, the term becomes longer. Further, the growing environment is limited in many cases, and a region of a contaminated soil where a plant can be cultivated is also limited.

In addition, in the method of adding said chelating agent to a soil, when the chelating agent is persistent (persistent with microorganisms or enzymes in the natural environment), the chelating agent which has not been absorbed by a plant remains in a soil. A fear that not only a plant itself undergoes a growth disorder with a remaining chelating agent, but also heavy metals fixed in a soil continues to be dissolved out, and is permeated deep in the ground, spreading secondary contamination, is pointed out.

In order to overcome such the problems, a soil cleaning method of specifying a plant to be used for cleaning, and utilizing a chelating agent selected from a group including biodegradable chelating agents (known publication 4) and a soil cleaning method utilizing L-glutamic acid diacetate (one kind of biodegradable chelating agents) (known publication 5) have been introduced.

However, a soil cleaning method which has a small fear of generating an environmental problem, and has a better efficiency of absorbing a large amount of heavy metals by a plant has not been reported.

DISCLOSURE OF THE INVENTION

Problems to be Solved by the Invention

An object of the present invention is to provide a method of cleaning up a soil containing heavy metals in a shorter term than ever before, at the same time, of cleaning up a contaminated soil, utilizing phytoremediation having a little effects on the environment.

Means to Solve the Problems

In order to solve the aforementioned problems, the present inventors continued to intensively study and, as a result, found out that a plant of Polygonaceae family, *Fagopyrum* genus (referred to as "*Fagopyrum* plant") specifically absorbs heavy metals (particularly, lead and lead compound) in a soil, resulting in the present invention.

That is, the present invention is a soil cleaning method of performing cleaning by absorbing a contaminating substance contained into a contaminated soil by a plant (phytoremediation), said method of cleaning heavy metals-containing soil comprising adding a biodegradable chelating agent promoting absorption of heavy metals by the *Fagopyrum* plant to the contaminated soil, wherein the contaminating substance is heavy metals, and the plant is a plant of Polygonaceae family, *Fagopyrum* genus.

It is desirable that, as the biodegradable chelating agent, one or two or more kinds selected from methylglycine diacetate (MGDA), ethylenediamine succinic acid (EDDS), L-glutamic acid diacetate (GLDA) and L-aspartic acid diacetate (ASDA) as well as a salt thereof are used.

It is further desirable to use methylglycine diacetate and/or a salt thereof as the biodegradable chelating agent.

As the *Fagopyrum* plant, one or two or more kinds selected from *Fagopyrum esculentum, Fagopyrum tartaticum* and *Fagopyrum cymosum* can be used.

Heavy metals to be cleaned up by the method of cleaning up a contaminated soil of the present invention is at least one kind of lead, cadmium, chromium, arsenic, zinc, copper, mercury, tin and selenium and metal compounds thereof.

The present invention can be suitably used for cleaning up a soil contaminated with lead and/or a compound containing lead.

In this case, it is desirable that a content of lead in the heavy metals-containing soil is 10 to 30000 mg/kg.

It is desirable that a concentration of the biodegradable chelating agent present in a soil where plants are grown is 0.01 to 100 mmol·kg$^{-1}$ soil.

The present invention can be utilized in cleaning out not only a soil contaminated with heavy metals, but also heavy metal contamination of any medium where a plant can be cultivated, such as contaminated water and the like.

That is, the present invention is a method of cleaning a medium by absorbing a contaminating substance contained in a medium by a plant, said method of cleaning heavy metals-containing medium comprising adding a biodegradable chelating agent promoting absorption of heavy metals to the contaminated medium, wherein the contaminating substance is heavy metals, and the plant is a *Fagopyrum* plant.

A method of cleaning heavy metals-contaminated soil by phytoremediation has previously required a long cleaning term, and secondary influence on the environment due to use of a hardly degradable chelating agent has been also feared. However, the present invention enables to clean effectively a soil contaminated with heavy metals, a representative of which is lead, at the low cost in a short term while influencing little on the environment and, further, retaining the environmental fine view, by using a *Fagopyrum* plant and a biodegradable chelating agent.

BRIEF DESCRIPTION OF THE DRAWINGS

FIG. 1 is a histogram showing an amount (10-3 g/plant) of lead accumulated in a terrestrial part of a plant which was grown with a mimic contaminated soil (lead concentration 200 mg/kg) for 2 months after seeding.

FIG. 2 is a histogram showing the lead dissolving out ability of 26 kinds of chelating agents (chelate regents).

FIG. 3 is a histogram showing the lead dissolving out ability of 6 kinds of chelating agents (chelating regents) by concentration level.

FIG. 4 is a histogram showing a lead concentration in leaves of *Fagopyrum esculentum* when each chelating agent by concentration level is added to a soil.

FIG. 5 is a histogram showing a lead concentration in stems of *Fagopyrum esculentum* when each chelating agent by concentration level is added to a soil.

FIG. 6 is a histogram showing a dry weight of leaves of *Fagopyrum esculentum* when each chelating agent by concentration level is added to a soil.

FIG. 7 is a histogram showing a dry weight of stems of *Fagopyrum esculentum* when each chelating agent by concentration level is added to a soil.

FIG. 8 is a histogram showing leaves concentration in a terrestrial part of *Fagopyrum esculentum* when each chelating agent by concentration level is added to a soil.

FIG. 9 is a histogram showing a dry weight of a terrestrial part of *Fagopyrum esculentum* when each chelating agent by concentration level is added to a soil.

FIG. 10 is a histogram showing a lead accumulation amount of a whole terrestrial part of *Fagopyrum esculentum*.

BEST MODE FOR CARRYING OUT THE INVENTION

In the present invention, a *Fagopyrum* plant is seeded or planted in a soil contaminated with heavy metals, heavy metals in a soil are absorbed and accumulated in a plant body component such as leaves, stems, roots, fruits and the like, thereafter, all or a part of a plant body of a *Fagopyrum* plant is harvested to remove it from the soil and process the soil, thereby, a soil is cleaned. For the purpose of rendering absorption of heavy metals by a *Fagopyrum* plant easily, a biodegradable chelating agent is added to a soil during cultivation of a *Fagopyrum* plant.

It was found out previously by the present inventors that *Fagopyrum esculentum* has the ability to accumulate heavy metals (particularly, lead) ("Study on Cleaning of Lead-Contaminated Soil Using *Fagopyrum esculentum*", the 83rd Japanese Society of Soil Science and Plant Nutrition, Chubu District Regular Meeting Lecture Abstract, page 44, Nov. 27, 2003). In addition to *Fagopyrum esculentum, Brassica juncca, Helianthus annus* and the like also have the heavy metals accumulating ability, and are utilized in phytoremediation.

The reason why a *Fagopyrum* plant was adopted in the present invention is as follows: it was found out by study of the present inventors that a *Fagopyrum* plant has the high ability to accumulate lead in a terrestrial part, but hardly undergoes a growth disorder due to lead, and a certain extent of a production amount of the plant is secured. In addition, a *Fagopyrum* plant is rapidly grown even cultivated in an unproductive soil, and maximum of three times of harvesting is possible in a year. Such the property of a *Fagopyrum* plant is suitable for an object of the present invention of performing cleaning up of a contaminated soil in a short term and effectively. Table 1 shows comparison of a lead accumulation amount between *Brassica juncca* which have previously been known to have the heavy metals absorbing ability and *Fagopyrum esculentum*.

TABLE 1

| Plant name | Terrestrial part lead concentration (mg/kg) | Terrestrial part dry weight (g/plant) | Terrestrial part lead accumulation amount (mg/plant) |
|---|---|---|---|
| *Fagopyrum esculentum**  | 4280 | 2.76 | 11.8 |
| *Brassica juncca** | 79 | 2.14 | 0.327 |

*Cultivated in a firing range soil (lead concentration 13032 mg/kg) for 2 months after seeding.

The contaminated soil to which the present invention is applied includes not only a soil of all lands where a plant can be cultivated such as industrial lands, agricultural lands, house lands, mountains and forests and the like, but also any medium where a plant can be cultivated by suitable treatment such as slime, sludge and the like. And, the contaminated medium is a concept including any medium which is a fluid (liquid, gas, viscous entity etc.) or a solid (agar medium etc.)

and in which a plant can be cultivated, in addition to the aforementioned contaminated soil.

The heavy metals include lead, cadmium, chromium, arsenic, zinc, copper, mercury, tin and selenium, as well as a metal compound thereof and, particularly, heavy metals to be cleaned is lead. The contaminated soil may contain heavy metals other than the aforementioned heavy metals.

Heavy metal contamination includes of course the case where subject heavy metals are present exceeding an environmental standard value prescribed by a law, and the case where the heavy metal is present exceeding a value which is considered to impact on human health, or other value which is considered to be socially problematic.

For cleaning up a soil undergoing heavy metal contamination, a *Fagopyrum* plant is grown in the soil. As the *Fagopyrum* plant, a plant which has been seeded and germinated in another place may be planted as a plantlet, or a plant may be seeded directly in the soil. It is the characteristic of a *Fagopyrum* plant that, even when sown as a seed, it is easily germinated and grown, and the cost required for growing a plantlet can be reduced. When seeds of a *Fagopyrum* plant are directly sown, it is suitable to sow seeds of 2 to 9 g per 1 $m^2$ area of the contaminated soil. A soil for cultivation can have a pH range of 4 to 8, desirably a pH of around 6.

Depending on the type of heavy metals to be cleaned up, in addition to a *Fagopyrum* plant, a plurality of kinds of plants such as *Brassica juncca*, a fern and the like may be cultivated by mixing them. Alternatively, if necessary, a fertilizer may be added and, for suppressing prosperity of weeds other than a *Fagopyrum* plant, a plurality of kinds of covering plants (ground cover plants) may be cultivated simultaneously. It is more effective that the ground cover plants have the heavy metals-accumulating ability.

After seeding, germinated and grown *Fagopyrum esculentum* flowers in about 1 to 2 months. At a growing stage until flowering, *Fagopyrum esculentum* highly accumulates lead, and is grown much. FIG. 1 shows a terrestrial part lead accumulation amount ($10^{-3}$ g/plant) and a growth amount of a plant which was grown in a mimic contaminated soil (lead concentration 200 mg/kg) for 2 months after seeding.

It is recognized that *Fagopyrum esculentum* tends to accumulate lead particularly in leaves among plant body components. Table 4 shows a lead concentration in leaves, stems and roots of *Fagopyrum esculentum* and *Blassica juncca* which were grown in a contaminated soil (lead concentration 13032 mg/kg) for 2 months after seeding.

A lead concentration in a soil or a plant body was analyzed using ICP-AES (inductively coupled plasma-atomic emission spectrometry) regarding a sample obtained by adding nitric acid and degrading this with a microwave.

For example, a lead concentration of the contaminated soil was analyzed as follows.

A large foreign matters (pebble, wood piece) are removed from an air-dried soil, a soil mass and clods of earth are roughly ground, and passed through a sieve with an opening of 2 mm, which is mashed in a mortar, and dried under the condition of 80° C.×24 h to obtain a sample soil.

After about 0.1 g of the sample soil is weighed, 5 mL of nitric acid is added, and degraded with a microwave, pure water is added to the degradation treated product to dilute it, and then passed through a filter paper to obtain the filtrate, which is analyzed using ICP-AES.

Since the thus cultivated *Fagopyrum* plant has absorbed lead from a contaminated soil, the effect of phytoremediation can be expected, and the present invention is characterized in that a biodegradable chelating agent promoting heavy metal absorption of a *Fagopyrum* plant is added to a contaminated soil simultaneously with cultivation of the *Fagopyrum* plant, to increase a lead accumulated amount furthermore.

Since the biodegradable chelating agent is degraded with microorganisms or enzymes in a soil, and hardly remains in the earth, a fear of secondary contamination is extremely low.

As the biodegradable chelating agent, one or two or more kinds can be added by selected from methylglycine diacetate (MGDA), ethylenediamine succinic acid (EDTS), L-glutamic acid diacetate (GLDA), L-aspartic acid diacetate (ASDA) and/or a salt thereof.

FIG. 2 shows comparison of the lead dissolving out ability of a chelating agent (including biodegradable and indegradable chelating agents). Although a chelating agent having the lead dissolving out ability such as sodium citrate and the like in addition to the aforementioned biodegradable chelating agents may be used, the lead dissolving out ability is not so much higher than the aforementioned biodegradable chelating agents.

As ethylenediamine tetraacetic acid (EDTA) which has been previously known to have the high lead dissolving out ability is indegradable, it remains in a soil, and may cause secondary environmental contaminant. Therefore, the EDTA is not preferable.

Some biodegradable chelating agents exhibit approximately the same lead dissolving out ability as that of the EDTA (FIG. 2) and, particularly, it was found out that methylglycine diacetate (MGDA), ethylenediamine succinic acid (EDDS), and L-glutamic acid diacetate (GLDA) can be suitably used in the present invention.

A concentration of the biodegradable chelating agent is added to be different depending on a concentration of heavy metals in a soil, a nature of a soil, types of the biodegradable chelating agent, the ability of the biodegradable chelating agent to dissolve out heavy metals in a soil, and an addition method and timing of the biodegradable chelating agent, and may be 0.01 to 100 mmol·$kg^{-1}$.

This is because when a concentration is too low, increase in a lead dissolution out amount can not be expected and, when a concentration is too high, a growth disorder (yellow leaves, leaf drop, wilting, deflection, etc.) is caused in a *Fagopyrum* plant, and the crop may be decreased.

The biodegradable chelating agent can be added to a soil by a method of spraying or sprinkling granules, powders or an aqueous solution directly to a soil. However, depending on a concentration of the aqueous solution, the aqueous solution can be added to a soil by a method without directly contacting with a *Fagopyrum* plant.

In addition, as a timing for adding the biodegradable chelating agent to a soil, the biodegradable chelating agent can be added to a contaminated soil before seeding, and/or can be added for a predetermined time after seeding. Depending on an addition amount, the biodegradable chelating agent may be added so that the chelating agent is present in a soil only for a predetermined time before harvesting a *Fagopyrum* plant.

By adding the biodegradable chelating agent, a *Fagopyrum* plant accumulates a larger amount of lead than the case of no addition. The thus cultivated *Fagpyrum* plant can be simply harvested using a combine or the like. After harvesting, *Fagopyrum esculentum* is dried and burned up, and accumulated lead is recovered.

A method of cleaning a soil contaminated with heavy metals using a *Fagopyrum* plant and a biodegradable chelating agent of the present invention can be also utilized as a method of cleaning water itself such as river and groundwater, which is a contamination medium, by hydroponic-cultivating a *Fagopyrum* plant.

EXAMPLES

Examples

The effect of the present invention will be explained in detail below in Examples. Since a soil where *Fagopyrum esculentum* was planted and cultivated in the present Example was sampled from an old firing range site, an extent of contamination with lead was high. A soil contamination standard value prescribed by Ministry of the Environment is shown in Table 2.

TABLE 2

| Types of Specific Hazardous Substances | Requirements |
| --- | --- |
| Cadmium and compounds thereof | 150 mg/kg · soil or lower |
| Hexavalent chromium compounds | 250 mg/kg · soil or lower |
| Cyanogen compounds | 50 mg/kg · soil or lower |
| Mercury or compounds thereof | 15 mg/kg · soil or lower |
| Selenium and compounds thereof | 150 mg/kg · soil or lower |
| Lead and compounds thereof | 150 mg/kg · soil or lower |
| Arsenic and compounds thereof | 150 mg/kg · soil or lower |
| Fluorine and compounds thereof | 4000 mg/kg · soil or lower |
| Boron and compounds thereof | 4000 mg/kg · soil or lower |

Soil Contamination Countermeasures Law, Regulation, Article 18, Section 2, Annexed List 3 (Dec. 26, 2002, Ministry of the Environment Ordinance No. 29)

A cultivating experiment was conducted as follows: in which *Fagopyrum esculentum* and *Brassica juncca* were cultivated in a lead-containing soil filled in a Wagnel pot, a chelating agent was further added to the soil, and a difference in a lead accumulating amount depending on the cultivating condition was examined.

Upon implementation of the experiment, in order to determine a type and a concentration of a chelating agent to be used, the following experiment was performed in advance.

<Experiment 1. Test of Comparing Lead Dissolving Out Ability of Chelating Agent>

In order to study a kind of a chelating agent to be added to a contaminated soil, the lead dissolving out abilities of 26 types of chelating agents (chelate reagents) were compared (FIG. 2).

(Test Method)

1) Subject soil: Soil A (sampled from an old firing range site, soil lead concentration 8239 mg/kg) was sufficiently air-dried, and passed through a sieve (2 mm), which was stirred to homogenize.

2) Chelating agent: Each chelating agent of 100 mmol·dm$^{-3}$ and pH 5.8 was prepared.

3) Five grams of 1) the subject soil and 50 ml of 2) the chelating agent were put into to a 100 ml vessel, and shaken (200 times/min) at 20° C. for 6 hours. Repeated cycle was 3.

4) For comparison, a contrast section was prepared, in which desalted water was added instead of the chelating agent in the 3).

5) After shaking, the sample after filtration was centrifuged at 15000 rpm for 5 minutes, and the supernatant liquid was further centrifuged again under the same condition.

6) From the separated supernatant liquid, a lead concentration was measured with an inductively coupled high frequency plasma spectrometry (ICP) device.

(Test Results)

Test results are shown in FIG. 2. An organic acid, such as citric acid and sodium citrate, an amino acid, such as L-cysteine, and commercially available chelating agents, such as disodium ethylenediamine tetraacetate (EDTA·2Na), trisodium methylglycine diacetate (MGDA·3Na), disodium ethylenediamine succinate (EDDS·3Na), and tetrasodium L-glutamic acid diacetate (GLDA·4Na) have the high lead dissolving out ability.

<Test 2. Test of Comparing the Lead Dissolving Out Ability of Chelating Agent at every Concentration Level>

Among the aforementioned seven types of chelate reagents, six types after excluding L-cysteine were further compared in the lead dissolving out ability by concentration level (FIG. 3).

(Test Method)

1) Subject soil: The same as in test 1.

2) Chelate reagent: citric acid, sodium citrate, disodium ethylenediamine tetraacetate (EDTA·2Na), trisodium methylglycine diacetate (MGDA·3Na), disodium ethylenediamine succinate (EDDS·3Na), tetrasodium L-glutamic acid diacetate (GLDA·4Na). Regarding each chelate regent, samples of 0.1, 1, 10 and 100 mmol·dm$^{-3}$ concentration were prepared, respectively, and adjusted to pH 5.8.

3) to 6) are the same as in test 1.

(Test Result)

According to test results shown in FIG. 3, each chelate reagent increased, a lead dissolution out amount between 0.1 and 10 mmol·dm$^{-3}$ (FIG. 3).

As a result of study of results of tests 1 and 2, as a chelating agent to be used in a cultivating experiment, sodium citrate, disodium ethylenediamine tetraacetate (EDTA·2Na), and trisodium methylglycine diacetate (MGDA·3Na) were selected. In addition, considering influence on plants and environment such as a salt concentration damage, 1, 5, 10 and 20 mmol kg$^{-1}$ soil of chemical reagents were adopted as an addition concentration, and 300 ml/pot (soil 3 kg) was provided as an addition amount.

<Cultivating Experiment>

(Experimental Method)

1) Test plant: *Fagopyrum esculentum*, trade name (Milkyway), *Brassica juncea*

2) Test soil: Soil B (sampled from an old firing range site, soil lead concentration 13032 mg/kg), contrast sample (mountain sand in Gifu Prefecture of Japan, soil lead concentration 21 mg/kg)

3) The soil B (3 kg) and the contrast section soil (4.3 kg) which had been passed through a sieve (2 mm) were mixed with urea (N: 69 mg/kg soil), calcium superphosphate (P: 75 mg/kg soil), potassium chloride (K: 72 mg/kg soil), and magnesia lime (Mg: 67 mg/kg soil), and sufficiently stirred.

4) The test soil was filled into a Wagnel pot (1/5000a), and a plant was seeded (3 pits/pot, 3 grains/pit).

5) Four to five days after germination, the plant was thinned out to 3 individuals/pot.

6) Cultivation in a gross chamber (Environmental Condition)

Temperature: 25° C.×12 h (8:00-20:00), 20° C.×12 h (20:00-8:00) Humidity: 60%

Illumination: light condition (8:00-20:00), dark condition (20:00-8:00)

Illuminance: 9800lx, 180µ mmol~$m^{-2} \cdot s^{-1}$

7) Aspersion was performed at 100 ml/pot every day.

8) During a test term, a position of a pot was changed four times.

9) Individuals which were about to fall were induced by a support post.

10) One week before harvesting, a chelating agent at each concentration was added to the soil B. An addition amount was 300 ml/pot, and the chelating agent was carefully added to a surface of the soil so that the chelating agent was not contacted with the plant. On the day before addition of the chelating agent and on the day of addition, aspersion was not performed. A list of the test sections is shown in Table 3. 11) Two months after seeding, harvesting was performed, *Fagopyrum esculentum* was measured for a dry weight and a lead concentration of leaves and stems (including a flower and a seed), and *Brassica juncea* was measured for a dry weight and a lead concentration of leaves and stems. In a test section without addition of the chelating agent, roots was also measured for a dry weight and a lead concentration. A lead concentration was measured by ICP-AES after degradation by a microwave degrading method using nitric acid.

12) Repeated cycles in all sections were 3 (3 pots/test section).

TABLE 3

| Soil | Plant name | Types of chelating agent | Chelating agent concentration in soil (mmol/kg soil) |
|---|---|---|---|
| Contrast section | *Fagopyrum esculentum* | No addition | — |
|  | *Brassica juncea* |  | — |
| Soil B | *Fagopyrum esculentum* |  | — |
|  | *Brassica juncea* |  | — |
|  | *Fagopyrum esculentum* | Sodium citrate | 1 |
|  |  |  | 5 |
|  |  |  | 10 |
|  |  |  | 20 |
|  |  | EDTA · 2Na | 1 |
|  |  |  | 5 |
|  |  |  | 10 |
|  |  |  | 20 |
|  |  | MGDA · 3Na | 1 |
|  |  |  | 5 |
|  |  |  | 10 |
|  |  |  | 20 |

Experimental Results

Table 4 shows a lead concentration and a dry weight of every organ of each plant which was cultivated in a contrast section or the soil B without addition of the chelating agent.

TABLE 4

|  |  | Contrast section | | Soil B | |
|---|---|---|---|---|---|
|  |  | *Fagopyrum esculentum* | *Brassica juncea* | *Fagopyrum esculentum* | *Brassica juncea* |
| Leaf | Lead concentration (mg/kg) | 13 | 15 | 7971 | 61 |
|  | Dry weight (g/plant) | 0.76 | 0.75 | 1.03 | 1.51 |
| Stem | Lead concentration (mg/kg) | 8 | 10 | 2043 | 202 |
|  | Dry weight (g/plant) | 1.31 | 0.70 | 1.80 | 1.07 |
| Terrestrial part (average) | Lead concentration (mg/kg) | 10 | 13 | 4201 | 119 |
|  | Dry weight (g/plant) | 2.07 | 1.45 | 2.83 | 2.58 |
| Terrestrial part | Lead accumulating amount (mg/plant) | 0.02 | 0.02 | 11.9 | 0.31 |
| Root | Lead concentration (mg/kg) | 55 | 34 | 3290 | 988 |
|  | Dry weight (g/plant) | 0.06 | 0.11 | 0.09 | 0.21 |

A lead concentration of *Fagopyrum esclentum* grown in the soil B was 7971 mg/kg in leaves, 2043 mg/kg in stems, 3290 mg/kg in roots, and 4201 mg/kg in an average of a terrestrial part. In *Brassica junecea*, the concentration was 61 mg/kg in leaves, 202 mg/kg in stems, 988 mg/kg in roots, and 119 mg/kg in an average of a terrestrial part.

The growth was not inhibited in both of *Fagopyrum escylentum* and *Brassica junecea* as compared with the contrast section, an amount of lead accumulated in a terrestrial part was 11.9 mg/Plant in the case of *Fagopyrum esculentum*, and 0.31 mg/Plant in the case of *Brassica junecea*.

From the forgoing results, it was made clear that *Fagopyrum esculentum* is not inhibited in growth and accumulates a high concentration of lead in a body, in a soil containing a high concentration of lead.

FIGS. 4 to 9 are a histogram showing a lead concentration and a dry weight of leaves, stems and a terrestrial part of *Fagopyrum esculemtum* when each chelating agent by concentration level is added to the soil. In addition, FIG. 10 shows a lead accumulating amount of a whole terrestrial part of *Fagopyrum esculentum*.

Further, numerical values of FIGS. 4 to 10 are summarized and, further, a terrestrial part lead accumulated amount of *Fagopyrum esculentum* per unit area ($m^2$) was calculated to obtain results, which are shown in Table 5.

TABLE 5

| Chelating agent | Concentration (mmol/kg · soil) | Leaf lead concentration (mg/kg) | Leaf dry weight (g/plant) | Stem lead concentration (mg/kg) | Stem dry weight (g/plant) | Terrestrial part lead concentration (mg/kg) | Terrestrial dry weight (g/plant) | Terrestrial part lead accumulation amount (g/plant) | Terrestrial part lead accumulation amount (g/m$^2$) |
|---|---|---|---|---|---|---|---|---|---|
| Contrast section | — | 7971 | 1.0314 | 2043 | 1.7988 | 4203 | 2.8302 | 0.0119 | 1.79 |
| Sodium citrate | 1 | 9320 | 0.9090 | 1815 | 1.9892 | 4169 | 2.8982 | 0.0121 | 1.82 |
| | 5 | 7099 | 1.0308 | 1671 | 1.6837 | 3732 | 2.7145 | 0.0101 | 1.52 |
| | 10 | 7195 | 0.7356 | 1524 | 1.7669 | 3191 | 2.5025 | 0.0080 | 1.20 |
| | 20 | 10270 | 0.8797 | 2286 | 1.9099 | 4806 | 2.7896 | 0.0134 | 2.01 |
| EDTA · 2Na | 1 | 7683 | 0.9799 | 1791 | 1.7240 | 3926 | 2.7039 | 0.0106 | 1.59 |
| | 5 | 10595 | 1.0307 | 2288 | 2.0750 | 5045 | 3.1057 | 0.0157 | 2.36 |
| | 10 | 18758 | 0.9617 | 3376 | 1.8899 | 8564 | 2.8516 | 0.0244 | 3.66 |
| | 20 | 30303 | 0.6389 | 8947 | 1.4969 | 15335 | 2.1358 | 0.0328 | 4.92 |
| MGDA · 3Na | 1 | 8981 | 0.9422 | 2310 | 1.9496 | 4484 | 2.8918 | 0.0130 | 1.95 |
| | 5 | 12607 | 0.8863 | 2384 | 1.8543 | 5690 | 2.7406 | 0.0156 | 2.34 |
| | 10 | 33735 | 0.7343 | 10098 | 1.5023 | 17858 | 2.2366 | 0.0399 | 5.99 |
| | 20 | 38601 | 0.5582 | 16437 | 1.3716 | 22848 | 1.9298 | 0.0441 | 6.62 |

It was confirmed that a lead concentration in leaves is increased by addition of the chelating agent, while the concentration is 7971 mg/kg in a contrast section.

Particularly, the high addition effect was shown in a soil of 10,20 mmol/kg of EDTA·2Na, and a soil of 10,20 mmol/kg of MGDA·3Na. A value 38601 mg/kg was shown in a soil of 20 mmol/kg of MGDA·3Na, where a lead concentration was the highest.

It was confirmed that a lead concentration in stems is also increased by addition of the chelating agent, while the concentration is 2043 mg/kg in a contrast section.

In particular, as in the case of leaves, the high addition effect was shown in a soil of 10,20 mmol/kg of EDTA·2Na, and a soil of 10·20 mmol/kg of MGDA·3Na.

By addition of the chelating agent, discoloration of leaves such as yellow leaves, wilting, leaf drop and the like were observed. In FIGS. 6, 7 and 9, it is considered that a lower dry weight at a higher concentration of the chelating agent is due to leaf drop.

In a soil of 20 mmol/kg of EEDTA·2Na, and a soil of 20 mmol/kg of MGDA·3Na, discoloration of leaves was observed two days after addition, and leaf drop was also confirmed partially in the latter.

Results of investigation of the growth situation of *Fagopyrum exculentum* four days after addition of the chelating agent are shown in Table 6.

TABLE 6

*Fagopyrum esculentum* growth situation (four days after addition of chelating agent)

| Chelating agent | Concentration (mmol/kg · soil) | Discoloration of leaf | Wilting of leaf | Leaf drop | Discoloration of flower |
|---|---|---|---|---|---|
| Contrast section | — | 2 | 1 | | |
| Sodium citrate | 1 | 5 | | | |
| | 5 | 2 | | | |
| | 10 | 4 | 4 | 2 | |
| | 20 | 5 | 6 | | |
| EDTA · 2Na | 1 | 3 | | | |
| | 5 | 4 | 1 | 1 | |
| | 10 | 6 | 2 | | |
| | 20 | 9 | 9 | 2 | 9 |
| MGDA · 3Na | 1 | 3 | 1 | 1 | |
| | 5 | 3 | 1 | | |
| | 10 | 2 | 6 | 2 | 5 |
| | 20 | 9 | 9 | 7 | 9 |

Numericals indicate the number of individuals for which symptom was observed.

In a soil of 20 mmol/kg of EDTA·2Na and a soil of 20 mmol/kg of MGDA·3NA, yellow leaves, spotting and discoloration of leaves, and discoloration of a flower were confirmed in all individuals. In addition, in a soil of 20 mmol/kg of MGDA·3Na, leaf drop was observed in almost all individuals. The cause is considered that a plant was exposed to a high concentration of the chelating agent, or a high concentration of lead was accumulated.

A terrestrial lead accumulated amount of *Fagopyrum esculentum* was highest as 0.0441 g/Plant in a soil of 20 mmol/kg of MGDA·3Na (3.7-fold of contrast section, 1.3-fold of soil of 20 mmol/kg of EDTA-2Na at the same concentration), and a soil of 10 mmol/kg of MGDA-3Na showed the next highest value of 0.0399 g/Plant (3.4-fold of contrast section, 1.6-fold of soil of 10 mmol/kg of EDTA-2Na at the same concentration).

From the forgoing results, MGDA·3Na which is a biodegradable chelating agent is suitable for acceleration of lead absorption of *Fagopyrum esculentum* and, in view of influence on growth such as leaf drop and the like of *Fagopyrum esculentum*, it is recognized that a concentration thereof is suitably 5 to 10 mmol/kg soil in the case of the soil lead concentration of around 13000 mg/kg.

The soil B used in the aforementioned Examples is a soil of high lead contamination.

INDUSTRIAL APPLICABILITY

According to phytoremediation utilizing *Fagopyrum esculentum* relating to the present invention, it is possible to clean a soil contaminated with heavy metals faster than before with little secondary contamination. This is particularly effective in a soil requiring rapid cleaning. In addition, phytoremediation can be also utilized in cleaning not only a soil but also sludge and water contaminated with heavy metals.

The invention claimed is:

1. A method of cleaning heavy metals-containing soil (phytoremediation) comprising:
    adding to the contaminated heavy metals-containing soil a biodegradable chelating agent, being trisodium methylglycine diacetate (MGDA-3Na), which promotes heavy metal absorption in a plant of a Polygonaceae family, *Fagopyrum* genus;
    adding to the contaminated heavy metals-containing soil a Polygonaceae family, *Fagopyrum* genus seed or plant to absorb a contaminating substance contained in the contaminated soil,
    wherein the contaminating substance is lead and/or lead compounds, and
    wherein the plant of Polygonaceae family, *Fagopyrum* genus is *Fagopyrum esculentum*.

2. The method of cleaning heavy metals-containing soil according to claim 1, wherein a lead content in the heavy metals-containing soil is 10 to 30000 mg/kg.

3. The method of cleaning heavy metals-containing soil according to 2, wherein a concentration of the biodegradable chelating agent present in the soil where the Polygonaceae family, *Fagopyrum* genus plant is grown is 0.01 to 100 mmol·kg$^{-1}$ soil.

4. The method of cleaning heavy metals-containing soil according to claim 3, wherein concentration of MGDA·3Na is 5 to 10 mmol/kg·soil in the case of the soil lead concentration around 13000 mg/kg.

* * * * *